(12) United States Patent
Tomimori (10) Patent No.: US 6,456,841 B1
(45) Date of Patent: Sep. 24, 2002

(54) MOBILE COMMUNICATION APPARATUS NOTIFYING USER OF REPRODUCTION WAITING INFORMATION EFFECTIVELY

(75) Inventor: Takeshi Tomimori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/323,241

(22) Filed: Jun. 1, 1999

(30) Foreign Application Priority Data

Sep. 7, 1998 (JP) .......................................... 10-252213

(51) Int. Cl.[7] .............................................. H04N 11/10
(52) U.S. Cl. ....................... 455/412; 455/413; 455/567; 379/88.12
(58) Field of Search ................................ 455/412, 414, 455/567, 566, 413, 450; 340/825.44; 379/88.15, 88.11, 88.12, 88.14

(56) References Cited

U.S. PATENT DOCUMENTS

| 5,737,394 A | * | 4/1998 | Anderson et al. | ....... 455/412 X |
| 5,764,731 A | * | 6/1998 | Yablon | ..................... 379/88.15 |
| 5,774,122 A | * | 6/1998 | Kojima et al. | .............. 345/355 |
| 5,872,521 A | * | 2/1999 | Lopatukin et al. | ..... 340/825.44 |
| 6,032,039 A | * | 2/2000 | Kaplan | ....................... 455/413 |

FOREIGN PATENT DOCUMENTS

JP 9284366 10/1997

* cited by examiner

Primary Examiner—Tracy Legree
(74) Attorney, Agent, or Firm—Rothwell, Figg, Ernst & Manbeck (57) ABSTRACT

A mobile communication apparatus capable of notifying a user of the presence of reproduction waiting information like a short message with proving the user with an impact. A controller of the mobile communication apparatus decides, when a flip is opened, whether the reproduction waiting information is stored in a RAM. If it is stored, the controller displays on a screen a window image including an icon associated with the reproduction waiting information. If there are more than one pieces of the reproduction waiting information, multiple icons are displayed in the window image. One of the icons is selected by placing the cursor on it, so that the reproduction waiting information associated with the icon is replayed in response to the operation of a memory key by the user.

6 Claims, 10 Drawing Sheets

MOBILE COMMUNICATION APPARATUS NOTIFYING USER OF REPRODUCTION WAITING INFORMATION EFFECTIVELY

BACKGROUND OF THE INVENTION

1. Field of the Invention

The present invention relates to a mobile communication apparatus like a mobile phone.

2. Description of Related Art

Mobile phones with various functions have rapidly diffused recently. Among these functions are short message services or answering (voice mail) services, which record short messages or the like in a message center of a mobile phone carrier for later playback when a user calls the message center.

Another type of mobile phones appear today which can store short messages by themselves. A user can play back the short messages by manipulating a function key and then entering a particular combination of digits through a numeric keypad.

Thus, to play back the short messages or the like, the user must remember the telephone number of the message center or the combination of digits. Otherwise, the user must refer to a manual every time he or she plays back. This is very inconvenient for the user, and improvement in operability is desired.

One of the techniques to improve the operability is disclosed in Japanese patent application laid-open No. 9-284366/1997. It relates to a mobile phone with a flip, which displays on its display, in response to a user opening the flip, a message that a voice mail has arrived together with the telephone number of a message center that stores the voice mail. In this state, the user can call the displayed telephone number by manipulating a call key.

This technique, however, has rather small impact on the user because it displays the message indicative of the voice mail and the telephone number using only characters and numerals. Accordingly, the user may sometimes miss the voice mail, and hence be unable to play back the voice mail eventually.

SUMMARY OF THE INVENTION

The present invention is implemented to solve the foregoing problem. It is therefore an object of the present invention to provide a mobile communication apparatus capable of effectively notifying a user of the presence of reproduction waiting information such as a short message that is not yet read.

According to a first aspect of the present invention, there is provided a mobile communication apparatus comprising a display screen that displays, in response to a starting operation of using the mobile communication apparatus, a menu image in a window, the menu image including an icon associated with reproduction waiting information containing at least an unread message.

Here, the reproduction waiting information maybe stored before the starting operation in one of memories installed in the mobile communication apparatus and in an external apparatus.

The display screen may display, when the reproduction waiting information includes a plurality of pieces of reproduction waiting information, a plurality of icons, each of which is associated with one of the plurality of pieces of reproduction waiting information.

The display screen may display in the menu image, when a user registered one or more functions from among a plurality of predetermined functions, icons associated with the one or more functions the user registered.

The display screen may display in the menu image icons associated with icon selection keys for selecting one of the icons which are displayed in the menu image.

The mobile communication apparatus may further comprise means for producing a sound at a time when the menu image is displayed.

The menu image may display only one of the icons at a time.

According to a second aspect of the present invention, there is provided a mobile communication apparatus comprising: an operation detector for detecting a starting operation of using the mobile communication apparatus; a storage for storing reproduction waiting information containing at least an unread message; decision means for making a decision, in response to detection of the starting operation by the operation detector, as to whether the storage stores the reproduction waiting information; and a display unit for displaying, in a window on a display screen, a menu image that includes an icon associated with the reproduction waiting information, when the decision means decides that the storage stores the reproduction waiting information.

According to a third aspect of the present invention, there is provided a mobile communication apparatus comprising: an operation detector for detecting a starting operation of using the mobile communication apparatus; a receiver for receiving a received message indicating that an external storage stores reproduction waiting information containing at least an unread message; decision means for making a decision, in response to detection of the starting operation by the operation detector, as to whether the receiver receives the received message; and a display unit for displaying, in a window on a display screen, a menu image that includes an icon associated with the reproduction waiting information, when the decision means decides that the received message is received.

DETAILED DESCRIPTION OF THE PREFERRED EMBODIMENTS

The invention will now be described with reference to the accompanying drawings.

Embodiment 1

Figure 1:
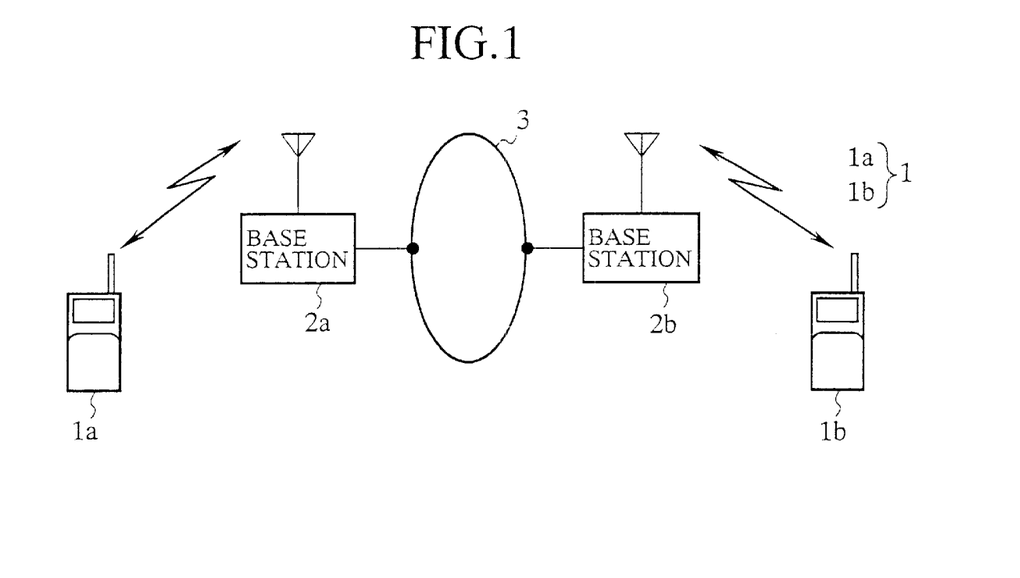
FIG. 1 is a schematic diagram showing a mobile phone system to which an embodiment 1 of a mobile phone in accordance with the present invention is applied.

FIG. 1 is a schematic diagram showing a mobile phone system to which an embodiment 1 of a mobile phone in accordance with the present invention is applied. The mobile phone system comprises a plurality of mobile phones 1a and 1b (which are generically referred to as "mobile phone(s) 1" from now on), a plurality of base stations 2a and 2b, and a communication network 3 interconnecting the base stations 2a and 2b through cables. With such a configuration, when the mobile phone 1a calls the mobile phone 1b, for example, the calling mobile phone 1a can communicate with the called mobile phone 1b through the base station 2a, communication network 3 and base station 2b.

Figure 2:
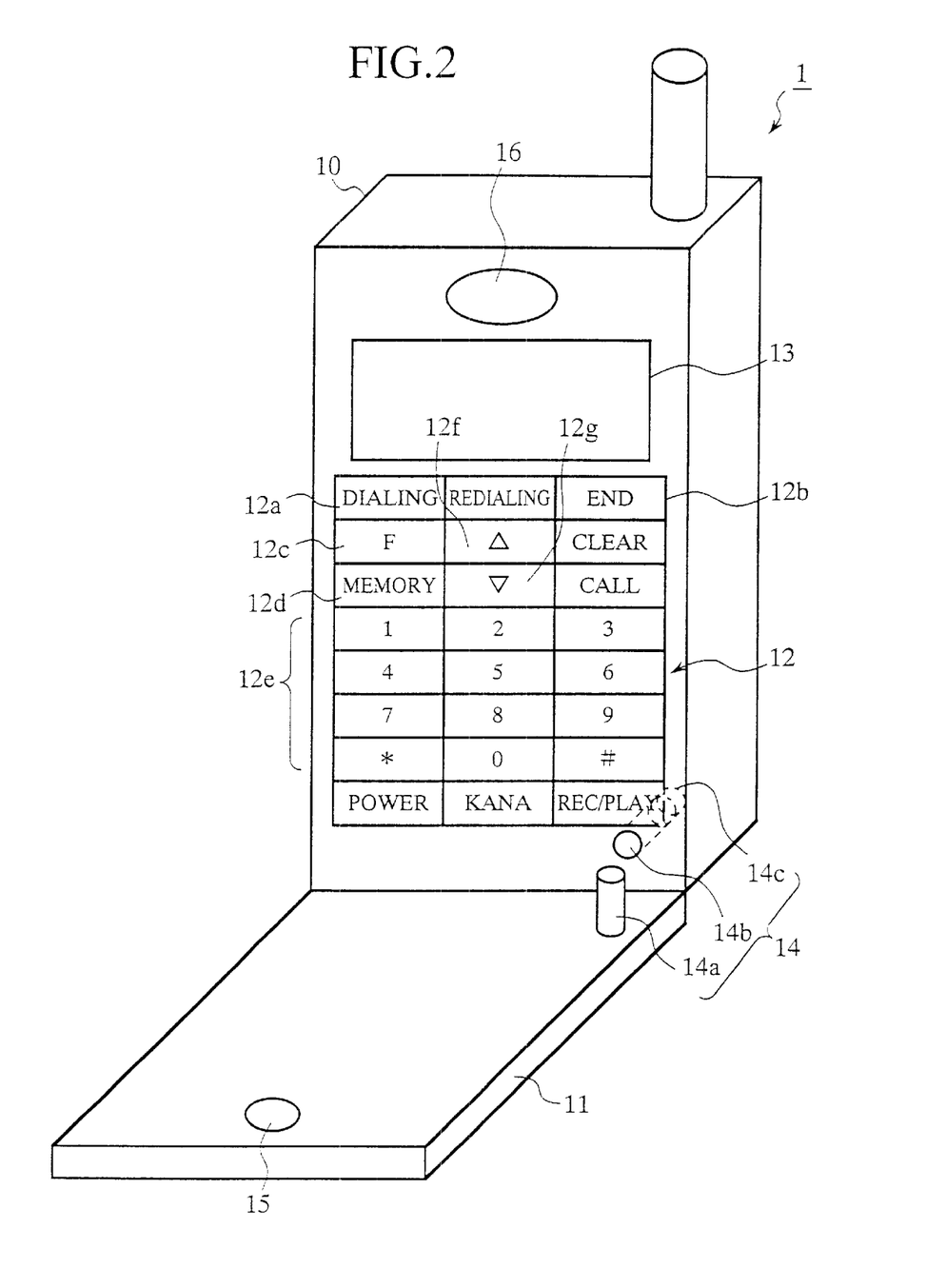
FIG. 2 is a perspective view showing an appearance of a mobile phone.

FIG. 2 is a perspective view showing an outward structure of the mobile phone 1. The mobile phone 1 comprises a body 10 and a flip 11 rotatably attached to the body 10. The flip 11 is mounted at the bottom of the body 10 with a mounting member (not shown) mainly to protect an operation panel 12 on the body 10.

The body 10 comprises a display unit 13 and the operation panel 12. The display unit 13 consists of a liquid crystal display or the like, and can display English letters, alphabets such as Japanese hiragana and katakana, numerals and icons.

The operation panel 12 includes a plurality of arrayed keys, such as a dialing key 12a, an end key 12b, a function key 12c, a memory key 12d, numeric keys 12e, an upper cursor key 12f and a lower cursor key 12g. These keys are generally mounted on any mobile phones to achieve their proper functions.

More specifically, the dialing key 12a is for originating a call and the end key 12b is for terminating the call. The function key 12c is for starting various functions provided for the mobile phone 1. The memory key 12d is for instructing to finalize an entry. The numeric keys 12e are for inputting besides the digits the alphabets like hiragana, katakana and English letters. The upper and lower cursor keys 12f and 12g are for selecting an item to be displayed on the display unit 13, or for moving the cursor displayed on the display unit 13.

The mobile phone 1 also comprises a flip open/close detector 14 for detecting the opening and closing of the flip 11 which is usually closed before use, and opened when the phone is used. Thus, the flip open/close detector 14 is provided for detecting the start of using the phone.

The flip open/close detector 14 comprises a protrusion 14a mounted on the flip 11, and a detection switch 14c attached at the bottom of an insertion hole 14b bored in the body 10. The insertion hole 14b is bored at a position opposite to the protrusion 14a when the flip 11 is closed.

When the flip 11 is closed, the protrusion 14a is inserted into the insertion hole 14b, and hence the head of the protrusion 14a depresses the detection switch 14c mounted at the bottom of the insertion hole 14b. Thus, the detection switch 14c generates a closed signal. In contrast, when the flip 11 is opened, the head of the flip open/close detector 14a leaves the detection switch 14c, so that the detection switch 14c outputs an opened signal.

The open/close detector can also use a magnet. More specifically, the flip open/close detector can comprise two magnets with opposite polarity and a magnetic sensor embedded in the body 10. The two magnets are mounted on the flip 11 and the body 10, respectively, and the magnetic sensor detects contact/separation of the two magnets.

Specifically, one of the magnet is embedded near the tip of the flip 11, and the other magnet is placed at the opposite position on the body 10, so that the two magnets oppose when the flip 11 is closed. Since the two magnets have opposite polarity, they attract each other when the flip 11 is closed, resulting in variation in magnetic field around the magnets. The magnetic sensor detects the variation, thus detecting the open and close of the flip 11.

The mobile phone 1 further comprises a microphone 15 mounted on the tip of the flip 11, and a speaker 16 provided in the body 10.

Figure 3:
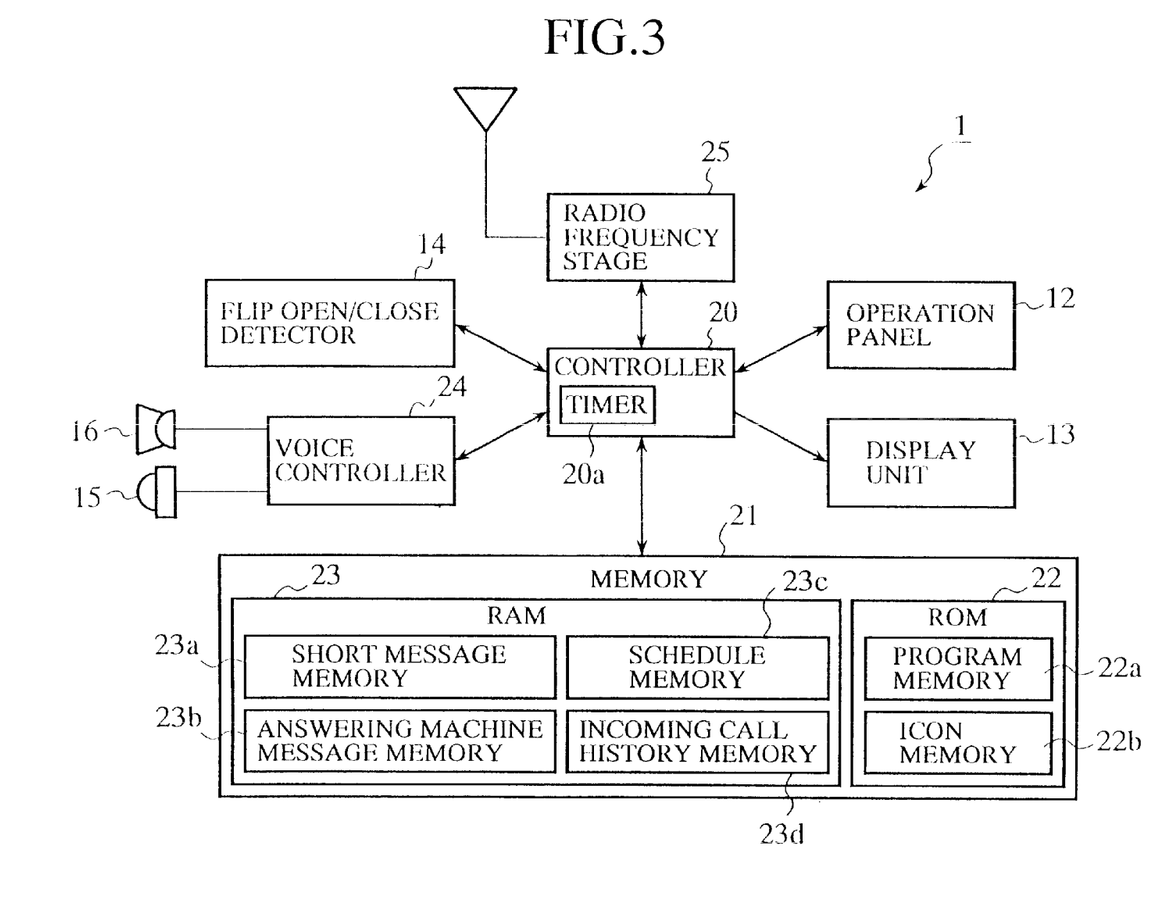
FIG. 3 is a block diagram showing a major electrical configuration of the mobile phone.

FIG. 3 is a block diagram showing a major electrical configuration of the mobile phone 1. The mobile phone 1 comprises a controller 20 that includes a CPU and carries out various functions of the mobile phone 1 including a short message function, answering machine function, scheduling function, incoming call history recording function and window display function.

The short message function is one that receives a short message sent from an originating mobile phone 1, stores it and plays it back. The answering machine function is one that receives a message sent from the originating mobile phone 1, records it and plays it back. The scheduling function is one that records schedules and reproduces them. The incoming call history recording function is one that records and displays incoming calls from originating mobile phones 1 in order. The window display function is one that notifies, through a window image, the user of the presence of reproduction waiting information to be played back. This makes it possible for the user to effectively perceive the presence of the reproduction waiting information. The reproduction waiting information includes unread short messages, unheard recorded messages, today's schedules or unanswered incoming calls that are not responded.

The controller 20 includes a timer 20a that records time and date, and is mainly used for schedule management.

The controller 20 is connected with a memory 21 including a ROM 22 that comprises a program memory 22a which stores a plurality of programs for implementing the above-mentioned functions. The ROM 22 further comprises an icon memory 22b that stores a plurality of icons, to which proper functions are assigned. More specifically, the icons includes a short message icon associated with the short message function, an answering machine icon associated with the answering machine function and a scheduling icon associated with the scheduling function.

The memory 21 also comprises a RAM 23 that includes a short message memory 23a, an answering machine message memory 23b, a schedule memory 23c and an incoming call history memory 23d. The short message memory 23a and answering machine message memory 23b are for recording short messages and answering machine messages (caller's messages) sent from the originating mobile phones 1, respectively. The schedule memory 23c stores schedules input from the operation panel 12, and the incoming call history memory 23d stores calls from the originating mobile phones 1 in order.

The controller 20 is connected to a display unit 13, and has it display necessary information in accordance with programs stored in the ROM 22. The controller 20 is connected to the flip open/close detector 14, and uses the outputs of the detection switch 14c of the flip open/close detector 14 for the window display function.

The controller 20 is further connected to the operation panel 12, a voice controller 24 and a radio frequency stage 25. The voice controller 24 is connected with the microphone 15 and speaker 16, and carries out processing needed for communications such as encoding/decoding. The radio frequency stage 25 performs processing mainly required for radio communications such as modulation and demodulation.

In a connected state of the circuit, the voice controller 24 converts the voice signal produced from the microphone 15 into transmitted data with a format appropriate to the communications, and supplies the transmitted data to the controller 20. The controller 20 assembles a transmission packet from the transmitted data, and supplies it to the radio frequency stage 25. The radio frequency stage 25 carries out a predetermined modulation processing based on the transmission packet to generate a modulation signal, and has the antenna radiate a transmission radio wave based on the modulation signal.

On the other hand, receiving a radio wave, the antenna supplies the radio frequency stage 25 with the modulation signal based on the radio wave. The radio frequency stage 25 generates a received packet through a modulation processing of the modulation signal, and supplies it to the controller 20. The controller 20 restores the received packet to its original received data, and supplies it to the voice controller 24. The voice controller 24 restores the received data to its original voice data, and has the speaker output the voice based on the voice data.

Figure 4:
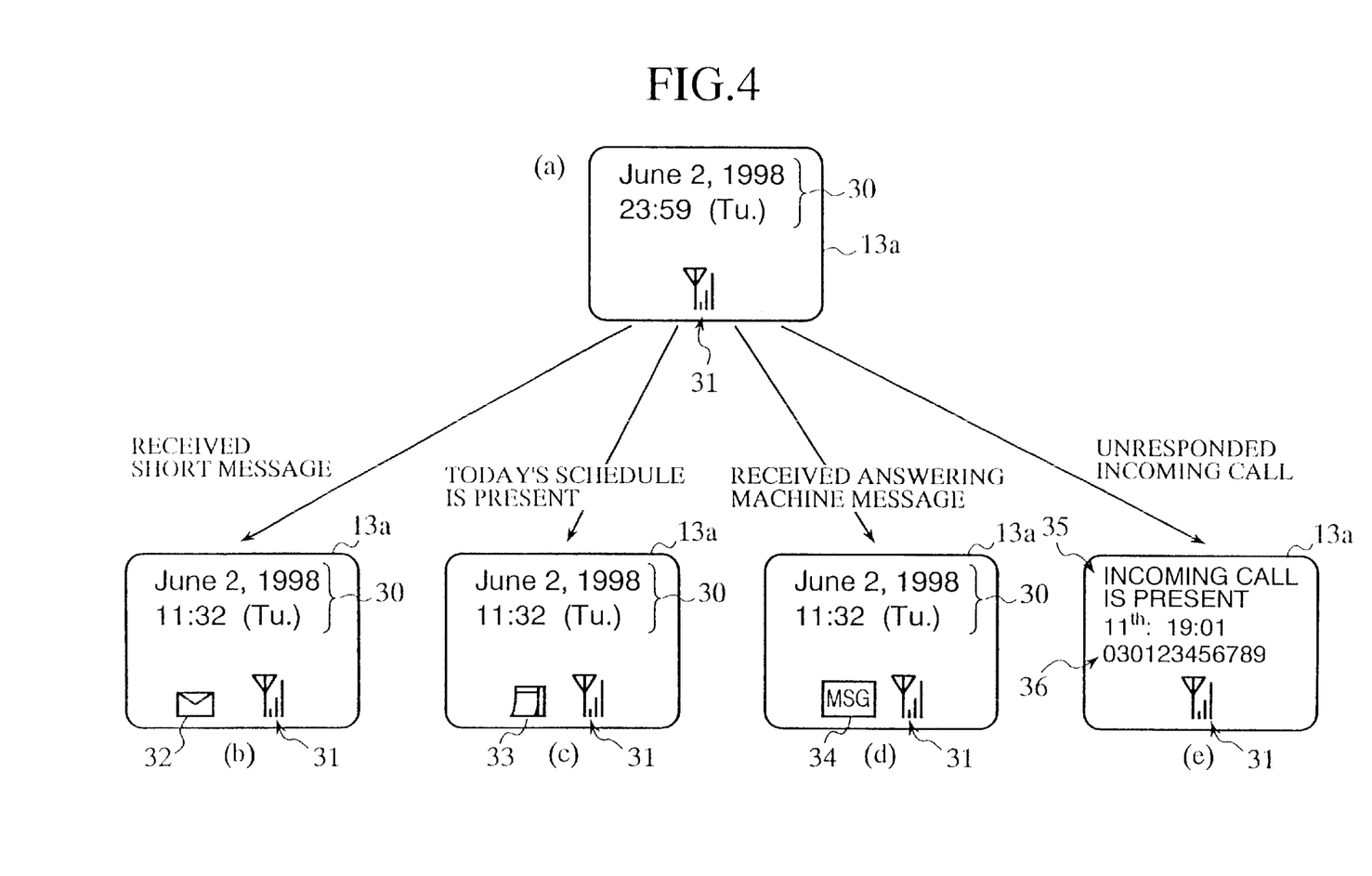
FIG. 4 is a diagram showing images displayed on a screen in response to the presence or absence of reproduction waiting information.

FIG. 4 is a diagram illustrating displayed images associated with the presence and absence of the reproduction waiting information. When the reproduction waiting information is absent, the controller 20 displays a normal reception waiting image on the display screen 13a on the display unit 13. As shown in FIG. 4(a), the normal reception waiting image includes date and time text information 30 consisting of the date, time and day of the week to be displayed at the top of the display screen 13a, and a radio receiving icon 31 to be displayed at the bottom of the display screen 13a.

Receiving a radio wave including a short message, for example, through the antenna in this state, the radio frequency stage 25 generates a received packet associated with the short message from the modulation signal based on the received radio wave, and supplies it to the controller 20. The controller 20 restores the original short message from the received packet, and stores the restored short message in the short message memory 23a in the RAM 23.

The controller 20 reads a short message icon 32 from the ROM 22, and displays it at a side of the radio receiving icon 31 on the display screen 13a such that the short message icon 32 does not interfere with the display of the date and time text information 30 as shown in FIG. 4(b). The controller 20 deletes the short message icon 32 when there is no more unread short message left, that is, when all the unread short messages have been reproduced.

To set a schedule, the user operates the numeric key pad 12e on the operation panel 12 to set a date in the near future, followed by changing the input mode to the alphabet input mode with the function key 12c, and by inputting a matter in the alphabet by depressing the numeric key pad 12e. Once the schedule has been input, the controller 20 stores it in the schedule memory 23c of the RAM 23, thereby completing the setting of the schedule.

The controller 20 makes a decision as to whether there is any schedule by the present time of that date (referred to as the "today's schedule" from now on) in the schedule memory 23c in accordance with the date and time recorded by the timer 20a. If there is any today's schedule, the controller 20 reads a schedule icon 33 from the ROM 22, and displays the read schedule icon 33 at a side of the radio receiving icon 31 as illustrated in FIG. 4(c). When the time set in the today's schedule has elapsed, the controller 20 deletes the schedule icon 33 because it is no more necessary to prompt the user to reproduce the past schedule.

Receiving a radio wave containing an answering machine message (incoming call message) through an antenna, the radio frequency stage 25 generates a received packed associated with the answering machine message from the modulation signal based on the received radio wave, and supplies it to the controller 20. The controller 20 restores from the received packet its original answering machine message, and stores it in the answering machine message memory 23b of the RAM 23.

The controller 20 reads an answering machine icon 34 from the ROM 22, and displays the read answering machine icon 34 at the side of the radio receiving icon 31 on the display screen 13a as illustrated in FIG. 4(d). The controller 20 deletes the answering machine icon 34 when there is no more unheard answering machine message left, that is, when all the unheard answering machine messages have been reproduced.

When any incoming call takes place, the controller 20 records its date and time in the incoming call history memory 23d of the RAM 23 regardless of whether the user responded to the incoming call or not. If the telephone number of the calling party is sent from the originating mobile phone 1 in this case, the controller 20 records the telephone number in the incoming call history memory 23d along with the date and time of the incoming call.

When the user did not respond to the incoming call from the originating mobile phone 1, the controller 20 displays on the display screen 13a an incoming call indicator 35 indicative of the occurrence of the incoming call using characters as illustrated in FIG. 4(e). In this case, if the telephone number of the calling party is sent, the originating telephone number 36 is displayed on the display screen 13a.

Thus, when the reproduction waiting information is present, the icon and characters indicative of that are displayed on the display screen 13a, which can prompt the user. In addition, to notify the user more effectively of the fact that the reproduction waiting information is present to more positively prompt the user to reproduce it, the present embodiment 1 displays the menu image in a window on the display screen 13a when the flip 11 is opened, that is, at the start of using the mobile phone.

Figure 5:
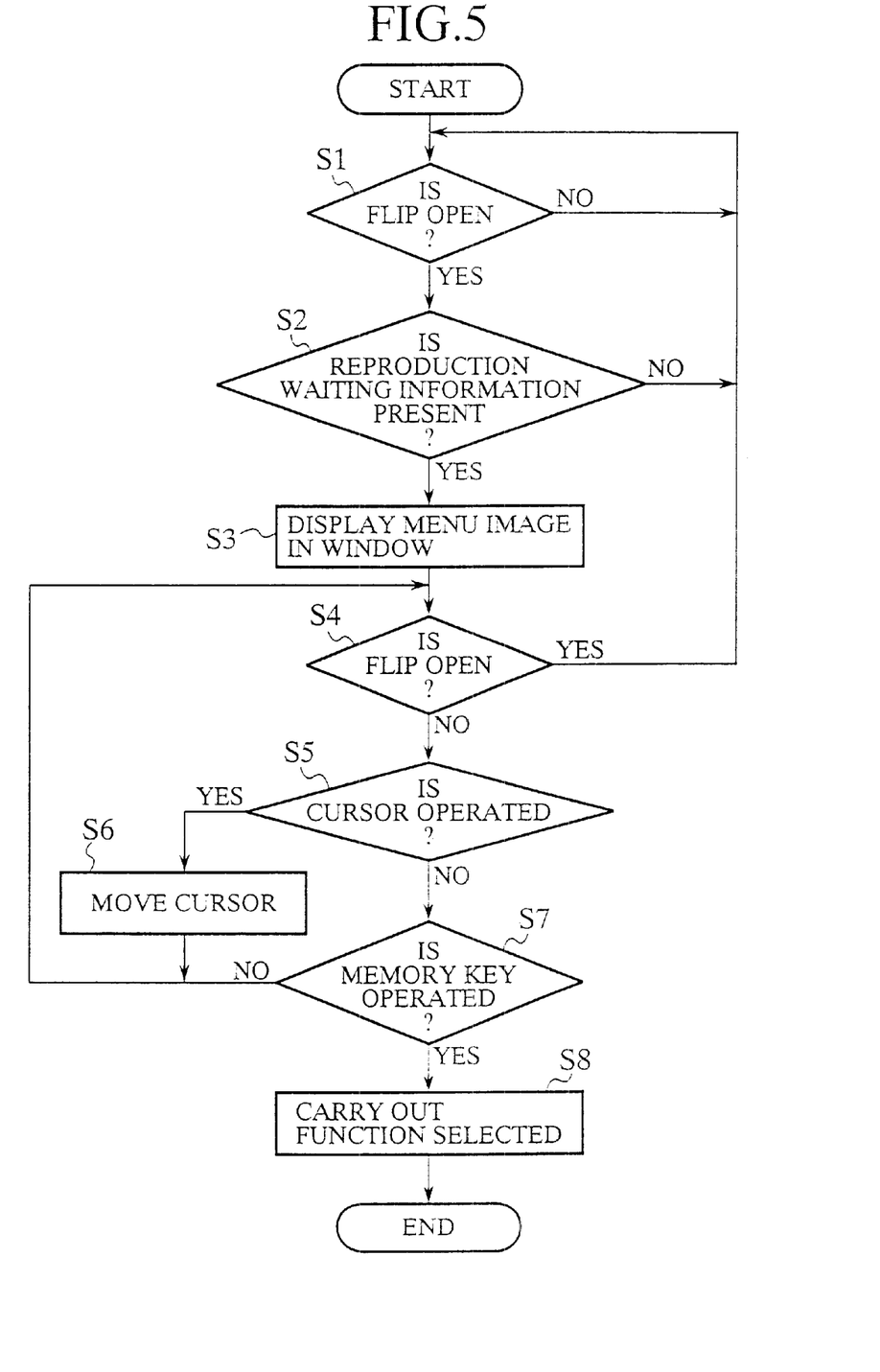
FIG. 5 is a flowchart illustrating a processing of a window display function.
Figure 6:
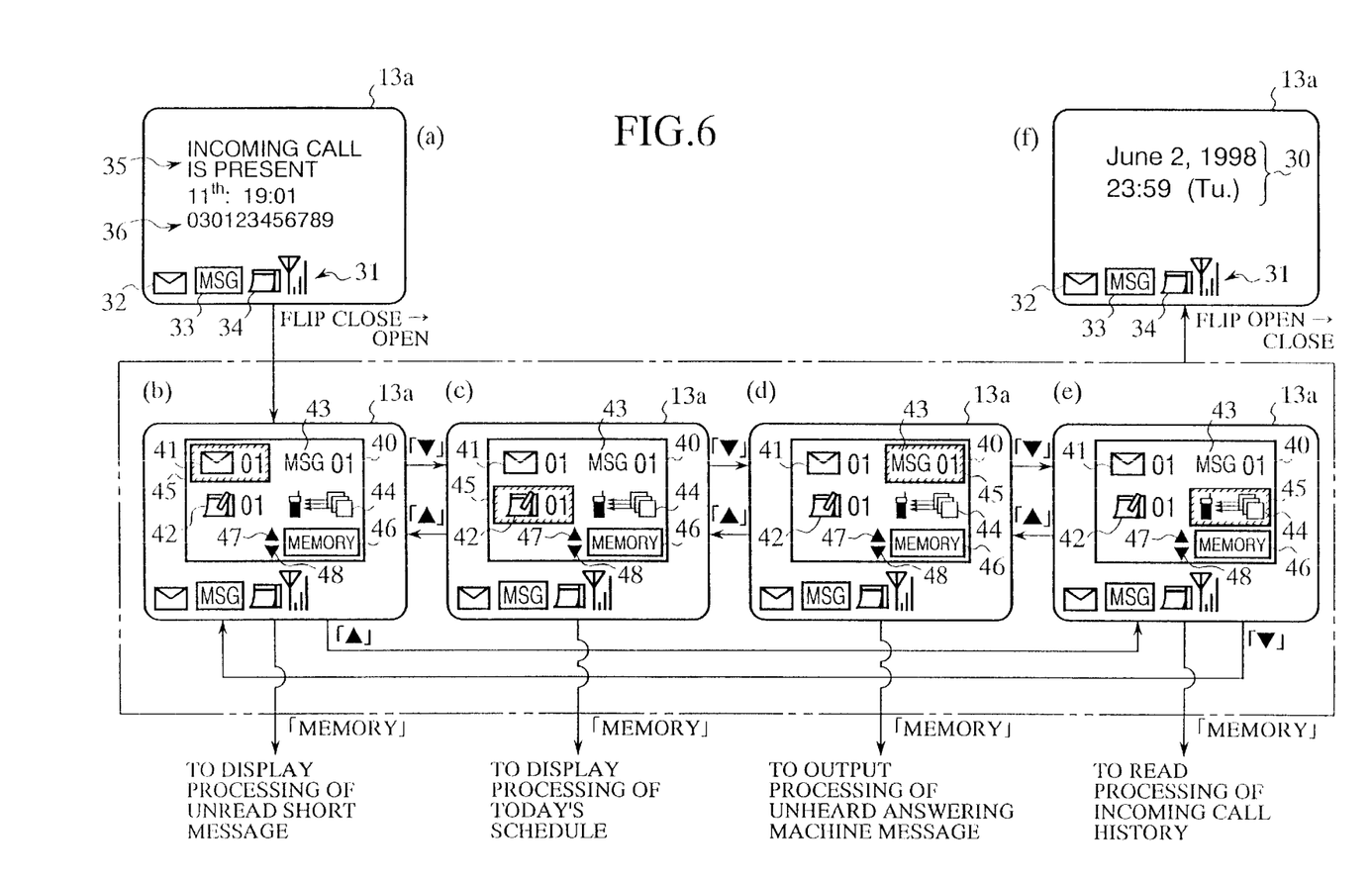
FIG. 6 is a diagram showing images displayed on a screen in response to the processing of the window display function.

FIG. 5 is a flowchart illustrating the processing of the window display function, and FIG. 6 is a diagram illustrating the display screens 13a corresponding to the flow of the processing of the window display function.

The controller 20 decides on whether the detection switch 14c of the flip open/close detector 14 supplies the controller 20 with the open signal or not at step S1. When the open signal is supplied, the controller 20 decides that the flip 11 is opened, and makes a further decision at step S2 as to whether any reproduction waiting information is recorded or not in the RAM 23 by accessing it. If the RAM 23 does not store any reproduction waiting information, the controller 20 makes the decision of step S1, again. On the other hand, if at least one piece of reproduction waiting information is stored, the controller 20 displays a menu image 40 in a window on the display screen 13a at step S3.

Let us assume here that an unread short message, an unheard answering machine message, and a today's schedule are present besides one or more unresponded incoming calls.

In this case, as shown in FIG. 6(b), the controller 20 blinks in a window 40 a short message icon 41, a schedule icon 42, an answering machine message icon 43 and an incoming call history icon 44, which correspond to the four pieces of the reproduction waiting information stored in the RAM 23, to indicate that the functions associated with the icons 41–44 are waiting to be carried out. In other words, the icons 41–44 are indications for prompting the reproduction of the reproduction waiting information associated with each of the icons 41–44. The controller 20 further blinks the number of records "1" of each reproduction waiting information at a side of each of the icons 41–44 in the window 40.

It is obvious that the icons 41–44 and the number of records can be continuously displayed instead of being blinked.

Furthermore, the controller 20 superimposes the cursor on one of the icons and its record number in the menu window 40. Specifically, the controller 20 superimposes the cursor 45 on the short message icon 41 and its record number displayed at the upper left in the window image 40 as shown in FIG. 6(b).

Moreover, the controller 20 displays a memory key icon 46 in the menu window 40 to notify the user that he or she can decide the icon associated with to the cursor 45 by manipulating the memory key 12d on the operation panel 12. The controller 20 further displays in the menu window 40 an upper cursor key icon 47 and a lower cursor key icon 48 notifying the user that he or she can move the cursor 45 in the menu window by manipulating the upper cursor key 12f and lower cursor key 12g in the operation panel 12.

After displaying the menu image, the controller 20 makes a decision at step S4 whether it is supplied with the closed signal from the detection switch 14c of the flip open/close detector 14. If supplied with the closed signal, the controller 20 decides that the user closes the flip 11 without the intention of reproducing the reproduction waiting information, and displays the original image as shown in FIG. 6(f) after deleting the menu image. In this case, since it is unnecessary to notify of the unresponded incoming call, the controller deletes the incoming call message 35 and the originating telephone number 36.

On the other hand, when the closed signal is not supplied, the controller 20 makes a decision at step S5 whether the upper or lower cursor key 12f or 12g is manipulated. If the decision is positive, the controller moves the cursor 45 in the menu window 40 in accordance with the operation of the cursor key at step S6.

For example, if the lower cursor key 12g is operated in the state as shown in FIG. 6(b), the controller 20 moves down the cursor 45 on the schedule icon 42 as shown in FIG. 6(c) Likewise, every time the lower cursor key 12g is operated from the state as shown in FIG. 6 (c), the controller 20 sequentially moves the cursor 45 onto the answering machine icon 43 at the upper right (FIG. 6(d)), onto the incoming call history icon 44 at the lower right (FIG. 6(e)), and onto the short message icon 41 at the original position (FIG. 6(b)).

In contrast, every time the upper cursor key 12f is operated from the state as shown in FIG. 6(b) in which the cursor 45 is superimposed on the short message icon 41, the controller 20 sequentially moves the cursor 45 onto the incoming call history icon 44 (FIG. 6(e)), the answering machine icon 43 (FIG. 6(d)), the schedule icon 42 (FIG. 6(c)), and the short message icon 41 (FIG. 6(b)).

Every time it moves the cursor 45, the controller 20 returns to the decision processing at step S4 because of the possibility that the flip 11 can be closed during the shift of the cursor. On the other hand, if the upper and lower cursor keys 12f and 12g are not operated from the beginning, or their operations are suspended on their way, the controller 20 makes a decision on whether the memory key 12d is operated or not at step S7.

Unless the memory key 12d is operated, the controller 20 moves to the decision processing at step S4 because of the possibility that the flip 11 can be shut before the memory key 12d is manipulated. On the other hand, if the memory key 12d is operated, the controller 20 recognizes the icon on which the cursor 45 is superimposed at that instant as the selected icon, and carries out the reproduction processing associated with the selected icon at step S8.

More specifically, if the memory key 12d is operated when the cursor 45 is superimposed on the short message icon 41, the controller 20 reads the unread short message stored in the short message memory 23a, and displays it on the display screen 13a.

Likewise, if the memory key 12d is operated when the cursor 45 is superimposed on the schedule icon 42 or the incoming call history icon 44, the controller 20 reads the today's schedule or incoming call history stored in the schedule memory 23c or incoming call history memory 23d, and displays it on the display screen 13a.

In addition, if the memory key 12d is operated when the cursor 45 is superimposed on the answering machine icon 43, the controller 20 reads the unheard answering message stored in the answering machine message memory 23b, and has the speaker output it through the voice controller 24.

Thus, the present embodiment 1 displays in the window on the display screen 13a the menu image 40 including the icons associated with the present reproduction waiting information and their record number. This makes it possible to effectively notify the user of the presence of the reproduction waiting information with providing impact on the user. Beside, blinking the icons and record number in the menu image 40 can increase the impact on the user. This enables the user to reproduce the reproduction waiting information without fail, thus providing sufficient service for the user.

Furthermore, mere selection of an icon in the menu image 40 enables the function associated with the icon to be carried out, and this simplifies the user operation. Moreover, since the menu image 40 indicates the keys for the selection and decision, it is unnecessary for the user to memorize the functions of the keys, which improves the operability of the equipment.

In addition, since the memory key 12d shares the icon selection function with its other original functions, it is unnecessary to provide a key dedicated to the icon selection, which enables the effective use of the space on the body 10.

Finally, when the flip 11 is closed, the menu image 40 is not displayed even if the reproduction waiting information is present, with displaying only the icons at positions which do not interfere with the date and time text information 30. Thus, when the flip 11 is closed, the mobile phone 1 can be used as a clock, without reducing the versatility of the mobile phone.

Embodiment 2

Figure 7:
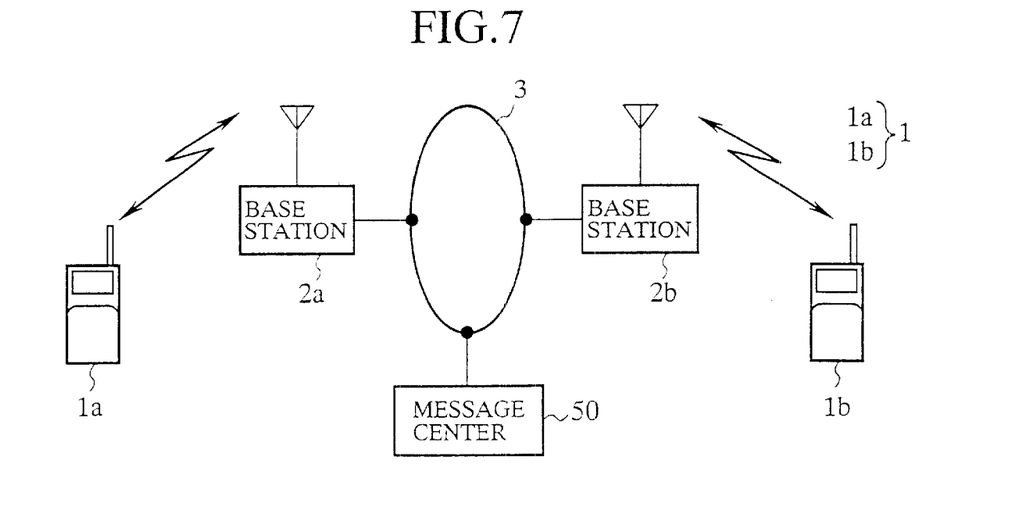
FIG. 7 is a schematic diagram showing a mobile phone system to which an embodiment 2 of a mobile phone in accordance with the present invention is applied.

FIG. 7 is a schematic block diagram showing a configuration of a mobile phone system to which an embodiment 2 of the mobile phone in accordance of the present invention is applied. In FIG. 7, the same reference numerals designate the same functional blocks as those of FIG. 1.

In the foregoing embodiment 1, short messages and answering machine messages are stored in the RAM 3 in the mobile phone 1. In contrast with this, the present embodiment 2 stores them in a message center 50 of a carrier so that the message center 50 notifies the terminating mobile phone of receiving the messages.

More specifically, the message center 50, which is connected to the communication network 3, has a plurality of message recording areas, each allotted to one of the users. If a called mobile phone 1 does not respond to the incoming call from a calling mobile phone 1, the message center 50 notifies the called mobile phone 1 of recording a short message or an answering machine message.

In connection with this, receiving the short message or answering machine message from the calling mobile phone 1, the message center 50 stores the message in the message recording area of the user of the called mobile phone 1. Subsequently, the message center 50 notifies the called mobile phone 1 of the received message indicating that the message center 50 has a record of the short message or answering machine message. In other words, the received message represents the type of the message stored in the message center 50.

Receiving the received message, the controller 20 of the called mobile phone 1 stores it in an allotted area in the RAM 23. More specifically, if the message stored in the message center 50 is a short message, the received message is stored in the short message memory 23a, whereas if it is an answering machine message, it is stored in the answering machine message memory 23b. Thus, the received message is stored in the RAM 23 as the reproduction waiting information.

When the received message is stored in the short message memory 23a or answering machine message memory 23b, the controller 20 reads from the ROM 22 the icon associated with the message type, and displays the read icon in the display screen 13a of the display unit 13 (see, FIG. 4(b) or 4(d)).

Figure 8:
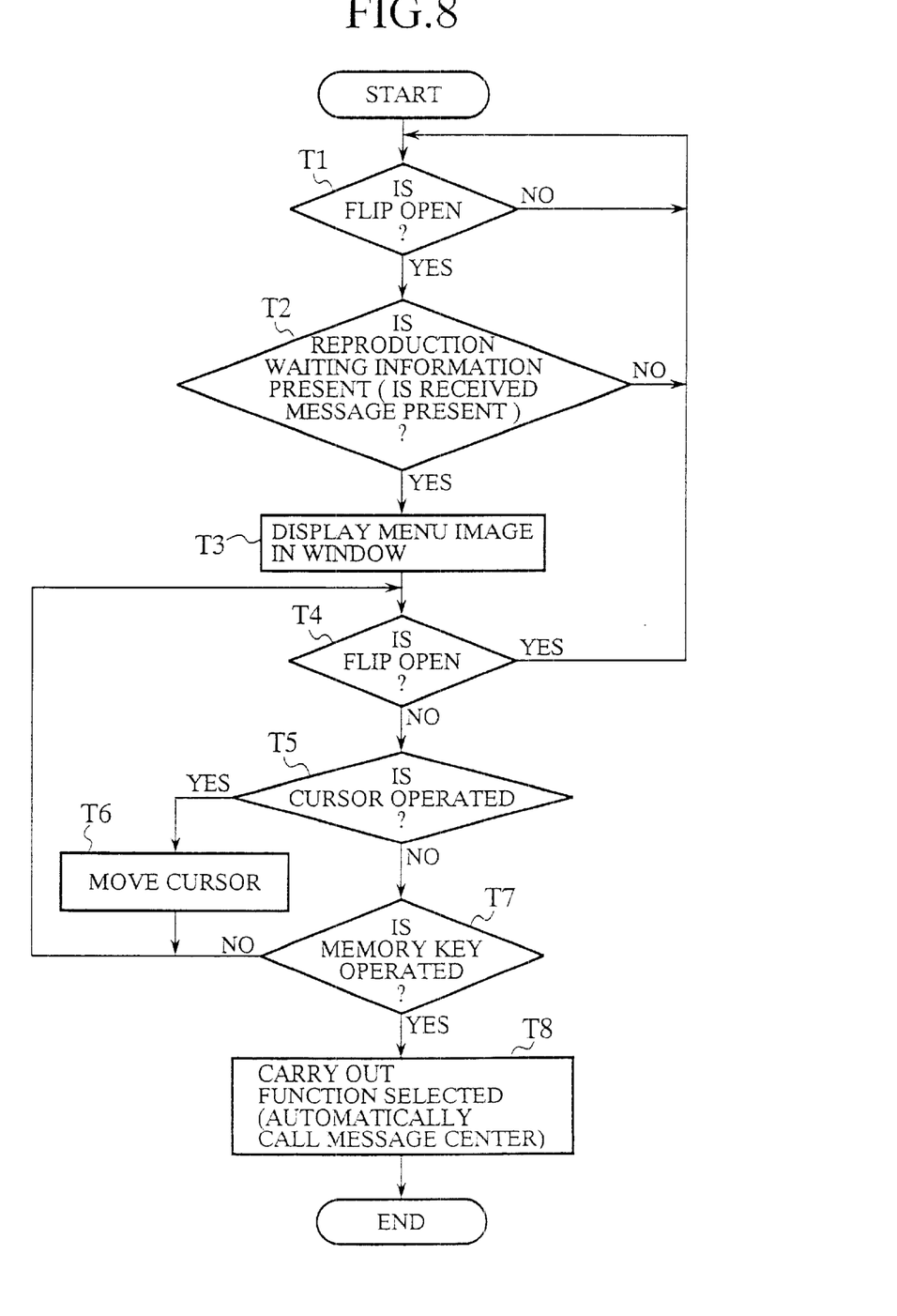
FIG. 8 is a flowchart illustrating a processing of a window display function carried out by the embodiment 2.

FIG. 8 is a flowchart illustrating a processing of the window display function of the present embodiment 2. Receiving the open signal from the detection switch 14c of the flip open/close detector 14 ("YES" at step T1), the controller 20 makes a decision that the flip 11 is opened, and then decides as to whether the reproduction waiting information is present in the RAM 23 at step T2.

In this case, the controller 20 searches the short message memory 23a and answering machine message memory 23b, and makes a decision as to whether there is any received message as the reproduction waiting information. If the reproduction waiting information is present, the controller 20 displays the menu image 40 in the window on the display screen 13a at step T3 as in the foregoing embodiment 1.

After that, if the received message is stored in the short message memory, the controller 20 sequentially carries out a decision step as to whether the flip 11 is closed or not at step T4, a decision step as to whether the cursor is operated or not at step T5, a cursor movement processing at step T6, and a decision step as to whether the memory key 12d is operated or not at step T7, followed by a decision that the short message icon 41 is selected. In this case, the controller 20 reads from the ROM 22 a telephone number of the message center 50, and automatically calls the telephone number at step T8.

When a channel is established with the message center 50, the message center 50 notifies the user of the keys to be manipulated to receive the message. The user operates the keys in accordance with the instructions. As a result, the message center 50 transmits the short message to the mobile phone 1. Thus, the short message stored in the message center 50 can be reproduced.

According to the present embodiment 2, even when the message center 50 of the carrier stores the short messages and answering machine messages in behalf of the mobile phones 1, it becomes possible to effectively notify the user of the presence of the reproduction waiting information with providing a strong impact on the user by displaying the menu image 40 in the window on the display screen 13a as in the embodiment 1.

Embodiment 3

Figure 9:
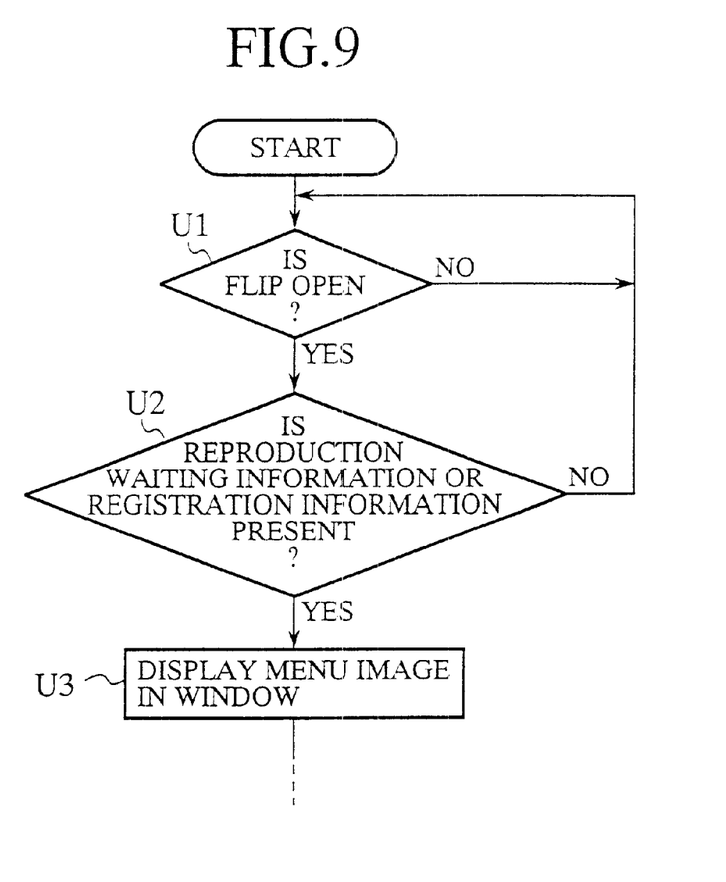
FIG. 9 is a flowchart illustrating a processing of a window display function carried out by an embodiment 3 of the mobile phone in accordance with the present invention.

FIG. 9 is a flowchart illustrating part of a processing of the window display function an embodiment 3 of the mobile phone in accordance with the present invention carries out. Here, step U3 in FIG. 9 is joined to the processing of step S4 and the following of FIG. 5, for example.

Although the icons to be displayed in the menu image 40 are limited to the predetermined four types in the foregoing embodiments 1 and 2, it will be convenient for a user if icons associated with functions that are often used can be displayed in the menu image 40. Typical often used functions include a volume control function of an incoming call, a charge display function, a manner mode function for enabling/disabling ringing, a telephone number display function of its own, calling number indicating function that enables a user to select whether to notify a called party of the user's telephone number. In view of this, the present embodiment 3 can display in the window image 40 icons associated with functions the user registers. To achieve this, the icon memory 22b of the ROM 22 stores icons associated with the entire functions assigned to the mobile phone 1.

Often used functions can be registered as follows. The user changes the function mode of the mobile phone into a function registration mode by manipulating the function key and numeric keys corresponding to a suitable combination of digits. In the function registration mode, the user registers desired functions. Then, the controller 20 stores in the RAM 23 registration information indicating the functions registered.

When carrying out the window display function, the controller 20 decides, in response to the opening of the flip 11 ("YES" at step U1), whether the reproduction waiting information or the registration information is present or not at step U2. In this case, if the registration information is present, the menu image 40 including the icon associated with the registration information is displayed on the display screen 13a regardless of whether the reproduction waiting information is present or not.

Figure 10:
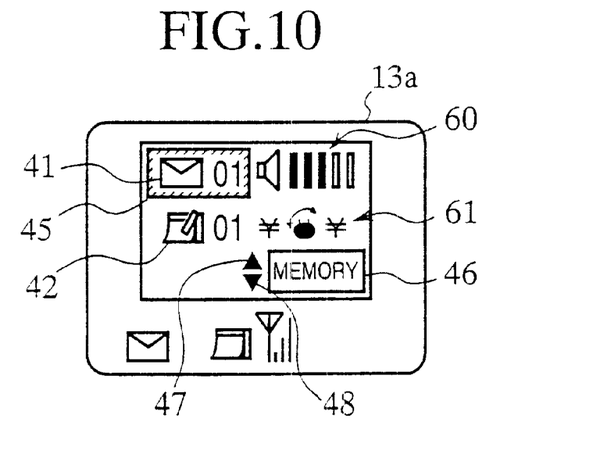
FIG. 10 is a diagram showing an example of an image displayed in a window in the embodiment 3.

For example, when the volume control function of the incoming call and the charge display function are registered, the window image 40 including an incoming call volume icon 60 and a charge icon 61 is displayed as shown in FIG. 10. If one of them is selected in this state, the controller 20 carries out, in response to the selection, the volume control processing of the incoming call or the charge display processing.

According to the present embodiment 3, the icons associated with the often used functions can be displayed in the menu image 40, and this will improve the service for the user.

Embodiment 4

Figure 11:
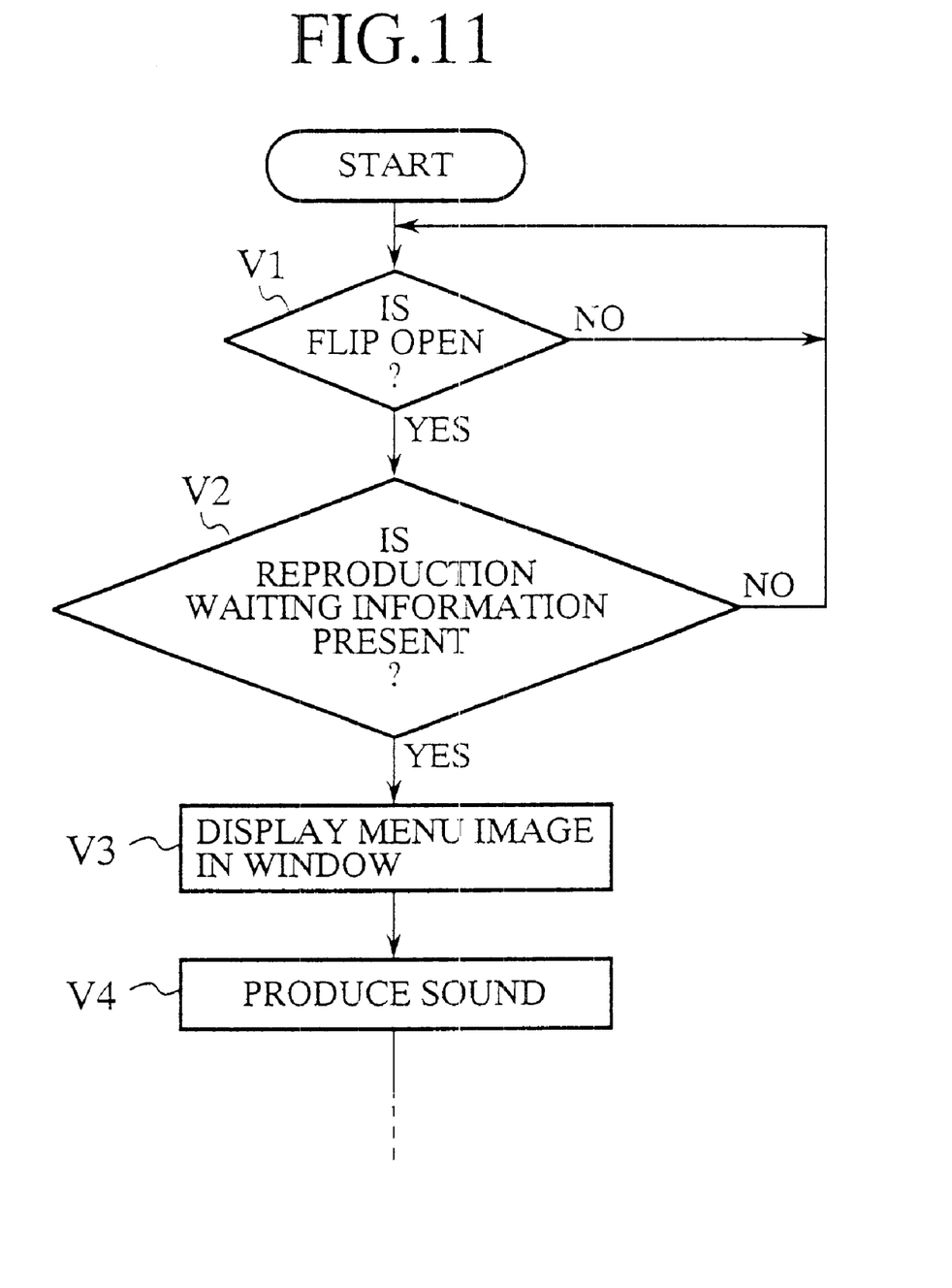
FIG. 11 is a flowchart illustrating a processing of a window display function carried out by an embodiment 4 of the mobile phone in accordance with the present invention.
Figure 12A:
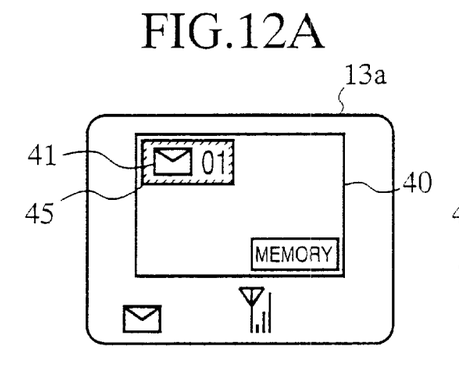
FIGS. 12A–12D are diagrams showing images displayed on a screen when the window display function is carried out in another embodiment of the mobile phone in accordance with the present invention.
Figure 12B:
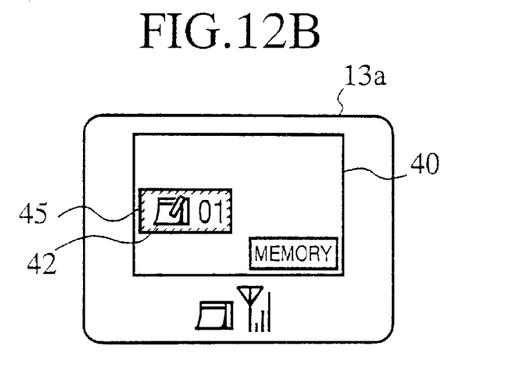
Figure 12C:
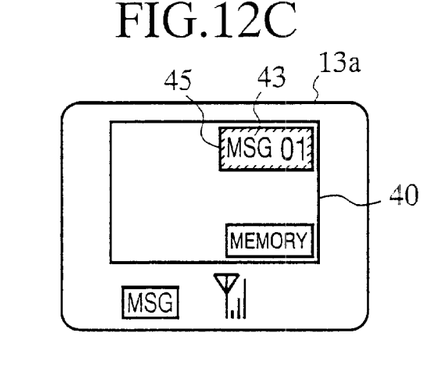
Figure 12D:
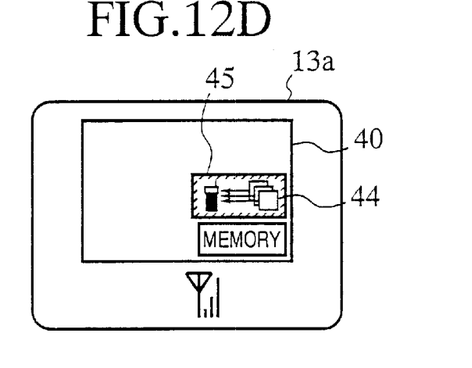

FIG. 11 is a flowchart illustrating a flow of the window display function carried out in an embodiment 4 of the mobile phone in accordance with the present invention, in which step V4 is joined to step S4 of FIG. 5, for example.

Although the controller 20 in the foregoing embodiments 1–3 displays only the menu image 40 in the window when the reproduction waiting information is present at a time the flip 11 is opened, the controller 20 of the present embodiment 4 emits a sound in addition to the display of the menu image 40.

More specifically, the controller 20 displays, when it makes a decision that the flip 11 is opened ("YES" at step V1) and that the reproduction waiting information is present at step V2, the menu image 40 in the window on the display screen 13a at step V3, and produces a sound from the speaker 16 at step V4.

According to the present embodiment 4, the user is notified of the presence of the reproduction waiting information not only by the menu image 40 but also by the sound. This makes it possible to further increase the impact on the user.

OTHER EMBODIMENTS

Although the four embodiments are described above, the present invention can be implemented by other embodiments. For example, although the foregoing embodiments are described about the mobile phones with the flip 11, the present invention can also be applied to mobile phones without a flip. In this case, a trigger for displaying the window image 40 is provided by a key operation or the like at the start of using the phone.

Furthermore, although the foregoing embodiments are configured such that they can select in the menu image 40 one of the plurality of pieces of reproduction waiting information and/or registration functions, a configuration can be implemented which displays only a single icon associated with one of the plurality of pieces of reproduction waiting information and/or registration functions as illustrated in FIGS. 12A–12D.

In this case, since it is unnecessary for the user to select an icon in the menu image 40, steps S5 and S6 of FIG. 5, for example, can be skipped. Besides, the upper and lower cursor key icons 47 and 48 are not displayed in the menu image 40.

Although the foregoing embodiments are described taking examples in which the present invention is applied to the mobile phones, the present invention can also be applied to other mobile communication apparatus such as PHS (Personal Handyphone System) receivers.

It will now be apparent from the foregoing to those skilled in the art that changes and modifications of the present invention can be made within the scope of the present invention.

What is claimed is:

1. A mobile communication apparatus, comprising:

a display screen that displays alphanumeric characters and graphic icons; and an active use detector which detects commencement of active use of the apparatus by a user while said apparatus is already in a standby state, and in response to detection of said commencement of using said mobile communication apparatus, causes said display screen to display an icon associated with unopened message information containing at least one unread text message or one unplayed voice message, and wherein said unopened message information is stored prior to said commencement of active use in one of memories installed in said mobile communication apparatus and in an external apparatus.

2. The mobile communication apparatus as claimed in claim 1, wherein said display screen displays, when said unopened message information includes a plurality of pieces of unopened message information, a plurality of icons, each of which is associated with one of said plurality of pieces of unopened message information.

3. The mobile communication apparatus as claimed in claim 1, wherein said display screen displays, when a user previously registered one or more functions from among a plurality of predetermined functions, icons associated with said one or more previously registered functions.

4. The mobile communication apparatus as claimed in claim 1, wherein said display screen displays icons associated with icon selection keys for selecting one of said icons which are displayed on said display screen.

5. The mobile communication apparatus as claimed in claim 1, further comprising means for producing a sound at a time when said unopened message icon is displayed.

6. The mobile communication apparatus as claimed in claim 1, wherein said display screen displays only one of said icons at a time.

* * * * *